(12) United States Patent
Mohandas et al.

(10) Patent No.: US 10,204,130 B2
(45) Date of Patent: Feb. 12, 2019

(54) TRANSACTIONAL TABLE TRUNCATION FOR CONCURRENT TRANSACTIONS

(71) Applicant: International Business Machines Corporation, Armonk, NY (US)

(72) Inventors: Praveen Mohandas, Olathe, KS (US); Sunil K. Sarin, Newton, MA (US); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 15/078,433

(22) Filed: Mar. 23, 2016

(65) Prior Publication Data

US 2017/0277744 A1   Sep. 28, 2017

(51) Int. Cl.
*G06F 17/00*  (2006.01)
*G06F 17/30*  (2006.01)

(52) U.S. Cl.
CPC .. *G06F 17/30371* (2013.01); *G06F 17/30339* (2013.01); *G06F 17/30348* (2013.01); *G06F 17/30362* (2013.01); *G06F 17/30368* (2013.01); *G06F 17/30377* (2013.01); *G06F 17/30595* (2013.01)

(58) Field of Classification Search
None
See application file for complete search history.

(56) References Cited

U.S. PATENT DOCUMENTS

| | | | | |
|---|---|---|---|---|
| 6,304,873 B1 * | 10/2001 | Klein | ............... | G06F 17/30421 |
| 6,339,772 B1 * | 1/2002 | Klein | ............... | G06F 17/30492 |
| | | | | 707/704 |
| 8,856,083 B2 | 10/2014 | Ganesh et al. | | |
| 9,165,050 B2 * | 10/2015 | Schreter | ............ | G06F 17/30595 |
| 9,264,399 B1 * | 2/2016 | Schryver | ............... | H04L 63/101 |
| 9,286,307 B2 * | 3/2016 | Maeda | ............. | G06F 17/30117 |
| 9,495,377 B2 * | 11/2016 | Blount | ............. | G06F 17/30117 |
| 2005/0234930 A1 * | 10/2005 | Hop Hing | ......... | G06F 17/30377 |
| 2006/0282438 A1 * | 12/2006 | Zhou | ................ | G06F 17/30961 |
| 2010/0011028 A1 * | 1/2010 | Dade | .................. | G06F 17/3033 |
| | | | | 707/E17.037 |
| 2011/0071986 A1 * | 3/2011 | Schmidt | ............ | G06F 17/30306 |
| | | | | 707/684 |

(Continued)

OTHER PUBLICATIONS

Daudjee, K. & Salem, K. (Sep. 2006). Lazy database replication with snapshot isolation. In Proceedings of the 32nd international conference on Very large data bases (pp. 715-726). VLDB Endowment.

(Continued)

*Primary Examiner* — Hung D Le
(74) *Attorney, Agent, or Firm* — Anthony Curro; Edell, Shapiro & Finnan, LLC

(57) ABSTRACT

A method, a processing device, and a computer program product are provided. A truncate table command for truncating all or a subset of one or more rows of a database table is received from a first transaction executing on a processing device. At least one read operation on the truncated database table is performed for at least one transaction concurrent with the first transaction, wherein the truncated rows are visible to the at least one concurrent transaction and invisible to subsequent transactions. Storage units that store the truncated rows are reclaimed in response to completion of the at least one concurrent transaction.

13 Claims, 13 Drawing Sheets

(56) References Cited

U.S. PATENT DOCUMENTS

| | | |
|---|---|---|
| 2013/0151480 A1 | 6/2013 | Dhamankar et al. |
| 2013/0226931 A1* | 8/2013 | Hazel ................ G06F 17/30185 |
| | | 707/741 |
| 2014/0074802 A1* | 3/2014 | Blount .............. G06F 17/30117 |
| | | 707/692 |
| 2014/0379674 A1 | 12/2014 | Bar et al. |
| 2015/0172390 A1 | 6/2015 | Colrain et al. |
| 2015/0254286 A1 | 9/2015 | Dutta et al. |
| 2016/0147449 A1* | 5/2016 | Andrei .............. G06F 17/30348 |
| | | 707/814 |
| 2016/0283545 A1* | 9/2016 | Benke ............... G06F 17/30303 |
| 2017/0177621 A1* | 6/2017 | Cardonha ......... G06F 17/30247 |

OTHER PUBLICATIONS

Disclosed anonymously (Apr. 2014). A method of basing on pre-query and multi-dimension self-adaptive parallelization of deleting from database table. IPCOM000236175D.

List of IBM Patents or Patent Applications Treated as Related, Apr. 2017, 1 page.

U.S. Appl. No. 15/078,433, filed Mar. 23, 2016.

U.S. Appl. No. 15/481,808, filed Apr. 7, 2017.

* cited by examiner

TRANSACTIONAL TABLE TRUNCATION FOR CONCURRENT TRANSACTIONS

BACKGROUND

Present invention embodiments are related to relational database systems for performing transactional table truncations. In particular, present invention embodiments are related to performing a truncate command while permitting a read operation on a truncated table, wherein the rows in the truncated table are visible to at least one concurrent transaction and invisible to subsequent transactions.

It is quite common, in database applications, to use a table by performing some analysis or queries, empty out the table, and then reuse the table by loading new data into the table in order to repeat the analysis or perform some other analysis. In database management systems (DBMSs) that support SQL, a standard relational database language, a table may be emptied by using a DELETE FROM <table> statement with no qualification, such as a "WHERE clause". However, individually deleting all rows (or marking them deleted in a multi-version DBMS) in a database table, as DELETE does, is an expensive operation due to locating rows via a full table scan, locking or other concurrency control overhead, and logging overhead for transaction recovery and durability. In some DBMSs, "transaction log full" errors may occur when insufficient log space was allocated.

ISO SQL: 2008 Standard includes a TRUNCATE TABLE operation for "fast emptying" of a table without having to examine any rows. Storage associated with the table is freed, or marked available for reuse, locking and logging are greatly streamlined, and "triggers" defined for row deletion are neither checked nor executed. For very large tables, a TRUNCATE operation can execute hundreds or thousands of times faster than a DELETE operation for all rows.

It is desirable to perform "emptying out" a table and loading fresh data into the table as a single atomic transaction such that current applications and queries do not see an intermediate empty state of the table. A concurrent query should either see the rows in the table before the emptying out, or the rows with the loaded fresh data after the emptying out. Oracle® (Oracle is a registered service mark of Oracle International Corporation of Redwood City, Calif.), which is a market-leading relational database management system (RDBMS), executes TRUNCATE as an implicit transaction by itself and also implicitly commits a current transaction from a same session, if there is one. Therefore, Oracle® cannot execute TRUNCATE as part of a larger transaction. The Informix® RDBMS (Informix is a registered trademark of International Business Machines Corporation of Armonk, N.Y.) is somewhat more tolerant than Oracle®, in that TRUNCATE can execute in a currently open transaction, if there is one, but must be followed by a COMMIT of the transaction (or ROLLBACK, if the changes from the transaction are to be discarded). In BOTH Oracle® and Informix®, it is not possible for a TRUNCATE to be followed by an INSERT or multiple serial or parallel INSERTs in order to load fresh data in a same transaction. As a result, applications may either execute a TRUNCATE followed by an INSERT or INSERTs as two separate transactions, making it possible for concurrent queries to see an empty table, or applications may execute a more expensive DELETE followed by the INSERT or INSERTs in a single atomic transaction.

Microsoft SQL Server, IBM PureData® (PureData is a registered trademark of International Business Machines Corporation of Armonk, N.Y.) for Analytics, and PostgreSQL permit TRUNCATE to be followed by other SQL commands, such as INSERT, in a same atomic transaction and permit transactions that truncate tables to be rolled back or committed as a whole. Therefore, in these RDBMs, it is possible to atomically "empty and reload" efficiently without a risk of concurrent queries seeing the table in an empty, inconsistent state. However, due to the fact that COMMIT of a truncating transaction frees up storage for the truncated tables, other problems may occur.

When using SQL Standard Repeatable Read or Serializable Transaction Isolation, or Snapshot Isolation, the following series of queries, where Ti are transactions and Qj are queries, runs into problems:

T0-Q1: Insert into TBL <1,000 rows>;
T0: Commit;
T1: Start with Repeatable Read, Snapshot, or Serializable Isolation. T1 will see only results of transactions that committed before T1 started, such as T0.
T1-Q1: Select count(*) from TBL;—returns 1,000
T2-Q2: Truncate Table TBL;
T2-Q3: Insert into TBL <500 rows>;
T2: Commit;
T3-Q1: Select count(*) from TBL;—returns 500, since T3 started after T2 committed and therefore sees all of T2's changes.
T1-Q1: Select count(*) from TBL;

One would expect T1-Q1 to return 1,000 rows because T1 did not see any of T2's changes (T2 committed after T1 started) under Repeatable Read, Snapshot Isolation or Serializable Isolation. However, in known DBMSs, storage space occupied by the original 1,000 rows in TBL is freed when T2 commits. Therefore, it is no longer possible to determine an original row count. After truncation, the table appears empty to all concurrent transactions, whether or not a concurrent transaction is using a snapshot taken before the truncation occurred.

SUMMARY

According to embodiments of the present invention, a method, a processing device, and a computer program product are provided. A truncate table command is received, from a first transaction executing on a processing device, to truncate all or a subset of rows of a database table. At least one read operation is performed on the truncated database table for at least one transaction concurrent with the first transaction, wherein the truncated rows are visible to the at least one concurrent transaction and invisible to subsequent transactions. Storage units storing the truncated rows are reclaimed in response to completion of the at least one concurrent transaction.

BRIEF DESCRIPTION OF THE DRAWINGS

Generally, like reference numerals in the various figures are utilized to designate like components.

DETAILED DESCRIPTION

Figure 1:
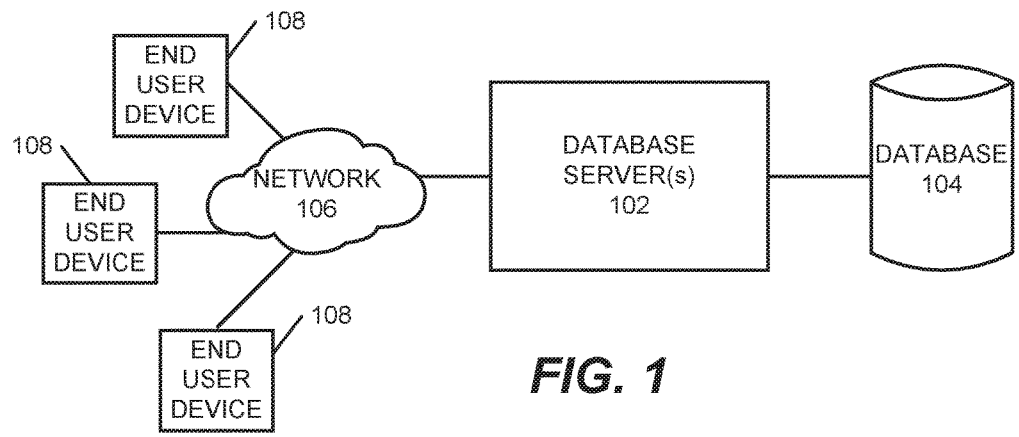
FIG. 1 illustrates an example environment for implementing various embodiments.

With reference now to FIG. 1, an example environment for implementation of embodiments is shown. One or more database servers 102 may have access to relational database 104. Multiple database servers 102 may be configured, in some embodiments, to act as a server farm. One or more database servers 102 may be connected to network 106, which may be a wired or wireless network or a combination thereof. One or more client or end user devices 108 may access database 104 via network 106 and one or more database servers 102.

Network 106 may be implemented by any number of any suitable communications media (e.g., wide area network (WAN), local area network (LAN), Internet, Intranet, etc.). Alternatively, one or more database servers 102 and end user devices 108 may be local to each other, and may communicate via any appropriate local communication medium (e.g., local area network (LAN), hardwire, wireless link, Intranet, etc.).

End user devices 108 enable users to submit queries to one or more database servers 102 to query database 104 and receive query results. Database 104 may store various information for queries and other database system operations. Database 104 may be implemented by any conventional or other database or storage unit, may be local to or remote from one or more servers 102 and end user devices 108, and may communicate via any appropriate communication medium (e.g., local area network (LAN), wide area network (WAN), Internet, hardwired, wireless link, Intranet, etc.). End user devices 108 may present a graphical user (e.g., GUI, etc.) or other interface (e.g., command line prompts, menu screens, etc.) to solicit information from users pertaining to desired data and reports, and may provide the data and the reports.

Figure 2:
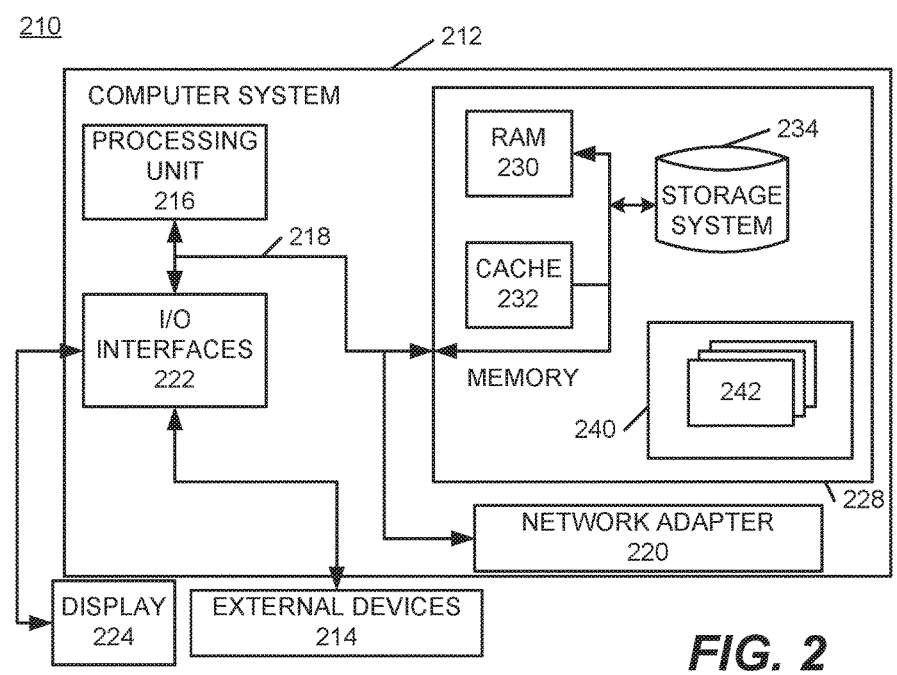
FIG. 2 shows a diagram of an exemplary processing device for implementing aspects of the embodiments.

Referring now to FIG. 2, a schematic of an example of a processing device 210, which may implement user device 108 or each of one or more servers 102 of environment 100, is shown. Processing device 210 is only one example of a suitable processing device for the environment of FIG. 1 and is not intended to suggest any limitation as to the scope of use or functionality of embodiments of the invention described herein. Regardless, processing device 210 is capable of being implemented and/or performing any of the functionality set forth herein.

In processing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types. Computer system 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system 212 is shown in the form of a general-purpose computing device. Components of computer system 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 228 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 220. As depicted, network adapter 220 communicates with the other components of computer system 212 via bus 218. It should be understood that, although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

A number of building blocks may be used to implement transactional truncate with Repeatable Read or stronger semantics. First, in most RDBMS, transaction identifiers are assigned in monotonically increasing order as transactions are started. Present invention embodiments will work with systems that assign monotonically increasing transaction identifiers as transactions are started and will work with systems that assign transaction identifiers that are not monotonically increasing as transactions are started.

Existing systems maintain multiple versions of data. Each row of the table (FIG. 6) may be labeled or stamped with an "insert transaction id", or insertxid 614, and a "delete transaction id", or deletxid 616. Insertxid 614 of a row, which we will refer to as row.insertxid, is an identifier of a transaction that inserted the row. Deletxid 616 of a row, which we will refer to as row.deletxid, is either undefined or is an identifier of a transaction that deleted the row. An updated row may be represented by deletion of an existing row and insertion of a new row with column values copied or changed as specified by an update command, resulting in two "versions" of the same row. After updating the row, deletxid 616 of the existing row version and insertxid 614 of the new row version will match.

Existing systems use transaction snapshot descriptors, or TXSDs. A snapshot descriptor is a data structure that allows the DBMS to determine whether or not changes are visible to a given transaction. For Repeatable Read or stronger isolation levels, only changes made by transactions that committed before the given transaction started and changes previously made by the given transaction are visible.

Present invention embodiments may use a function, IsTxVisible, whose return value indicates whether a given transaction committed before another transaction. IsTxVisible(txid, txsd) returns true or false depending on whether a transaction with identifier txid committed before a transaction whose descriptor is txsd started. In one embodiment, in which txids are monotonically increasing, a txsd for a given transaction could include a transaction's identifier, txsd.ID and an "invisibility list", txsd.InvisList of txids of transactions that started before the given transaction started, but had not committed before the given transaction started.

Figure 3:
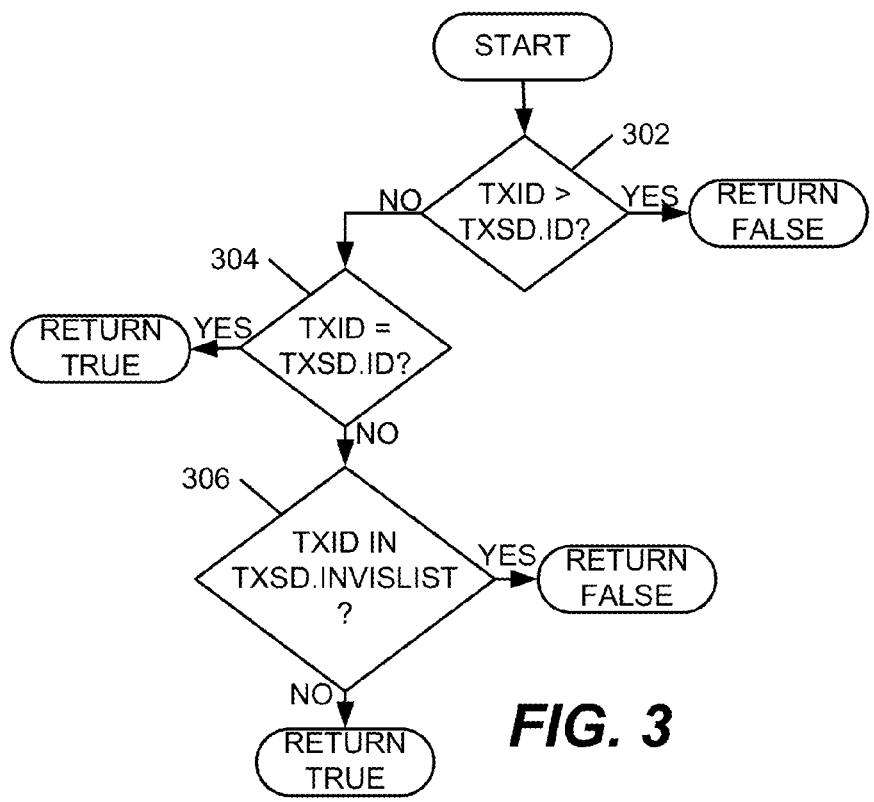
FIG. 3 is an flowchart explaining example processing of an IsTxVisible function.

FIG. 3 is a flowchart that illustrates exemplary processing for the IsTxVisible(txid, txsd) function. First, a processing device may determine whether a transaction identifier txid is greater than an identifier txsd.ID (act 302). If txid is greater than txsd.ID, then IsTxVisible returns a false value. If txid is not greater than txsd.ID, then the processing device may determine whether TXID is equal to txsd.ID (act 304). If txid is equal to txsd.ID, then the function returns a true value. Otherwise, the processing device may determine whether txid is in an invisibility list txsd.InvisList (act 306). If txid is in txsd.InvisList, then IsTxVisible returns a false value indicating that txid did not commit before transaction txsd.ID started. If txid is not in txsd.ID, then IsTxVisible returns a true value indicating that txid did commit before transaction txsd. ID started.

Figure 4:
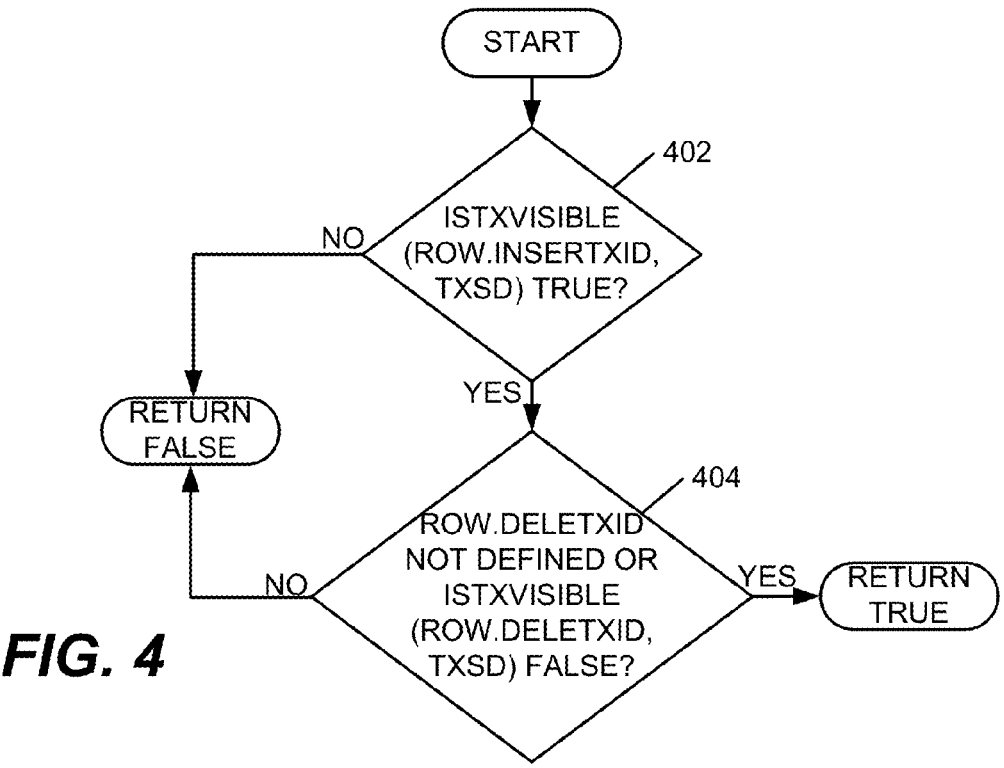
FIG. 4 is a flowchart explaining example processing of an IsRowVisible function.

Present invention embodiments have a mechanism for determining whether a given row is visible to a given transaction. Present invention embodiments may use a function called IsRowVisible(row, txsd) that determines whether a given row, with associated insertxid 614 and deletxid 616, is visible when a transaction snapshot descriptor is txsd. FIG. 4 is a flowchart that illustrates exemplary processing for function IsRowVisible. The process may begin with a processing device executing the function IsTxVisible(row.insertxid, txsd) to determine whether insertion of a row is visible to txsd (act 402). If the insertion of the row is visible to txsd, then the processing device may execute the function IsTxVisible(row.deletxid, txsd) to determine whether the row is either not marked as deleted or deletion of the row is not visible to txsd (act 404). If the row is not marked as deleted or the deletion of the row is not visible to txsd then IsRowVisible returns a true value. Otherwise, IsRowVisible returns a false value.

Figure 5:
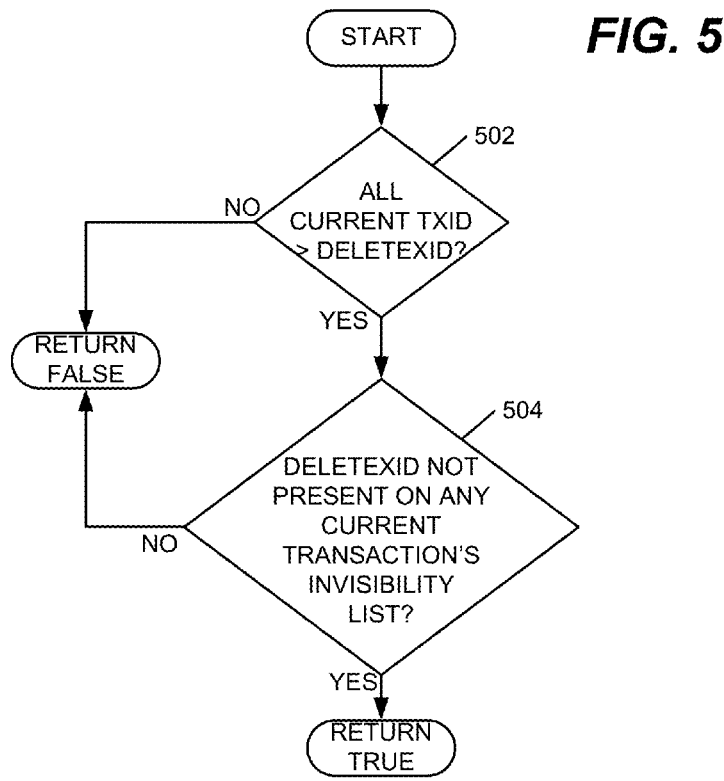
FIG. 5 is a flowchart illustrating example processing of an IsDeleteReclaimable function.

Present invention embodiments have a method for determining when a deleted row, and associated storage space, can be reclaimed, or freed up, by the system. Present invention embodiments use a function, IsDeleteReclaimable. FIG. 5 is a flowchart illustrating example processing for the function IsDeleteReclaimable. The function may be called passing deletxid 616 of a row to the function. In a system that uses monotonically increasing transaction identifiers, a processing device may determine whether all current txids are greater than a deletetxid of a transaction that deleted a row (act 502). If not, then the function returns a false value. Otherwise, the processing device may determine whether the transaction ID for the transaction that deleted the row is absent on all current txids' invisibility list (act 504). If so, then the function returns a true value indicating that the deleted row is reclaimable. Otherwise, the function returns a false value indicating that the deleted row is not reclaimable. In various embodiments, the triggering of reclamation may be by explicit user command, or partly or fully automated based on completion of current transactions.

Most DBMSs exclusively lock a table when executing a Truncate Table command such that concurrent queries, including simple SELECTs, are not permitted against the table. This reflects a history of treating a Truncate Table command as Data Definition Language (DDL). This is restrictive and inconsistent with treating TRUNCATE as logically equivalent to a DELETE of all rows, which is considered Data Manipulation Language (DML). In present invention embodiments, in order to permit concurrent queries with TRUNCATE (with appropriate isolation semantics), TRUNCATE may acquire a weaker lock on a table that does not preclude concurrent SELECT commands and does not preclude concurrent INSERTs, UPDATEs, DELETEs, and TRUNCATEs that would affect rows and storage units currently present in the table. Because lock types vary among RDBMS, a form of lock for TRUNCATE that has these properties will vary depending on the RDBMS. For example, with PostgreSQL, TRUNCATE TABLE currently acquires an "Access Exclusive" lock on a table, which locks out all concurrent operations on the table including SELECT. A weaker but sufficient lock would be "Exclusive", which allows concurrent SELECTs but does not allow concurrent INSERTs, UPDATEs, DELETEs, and TRUNCATEs. Concurrency may be further improved with a "RowExclusive" lock ("Intent Exclusive" in some DBMSs) on the table plus exclusive locks on the individual storage units being truncated. This would not allow concurrent INSERTs, UPDATEs and DELETEs that affect rows in the truncated storage units. Concurrent INSERTs would insert rows into newly-allocated storage units only, and concurrent UPDATEs and DELETEs that affect only such newly-inserted rows (and not any rows on the truncated extents) would be permitted.

Figure 6:
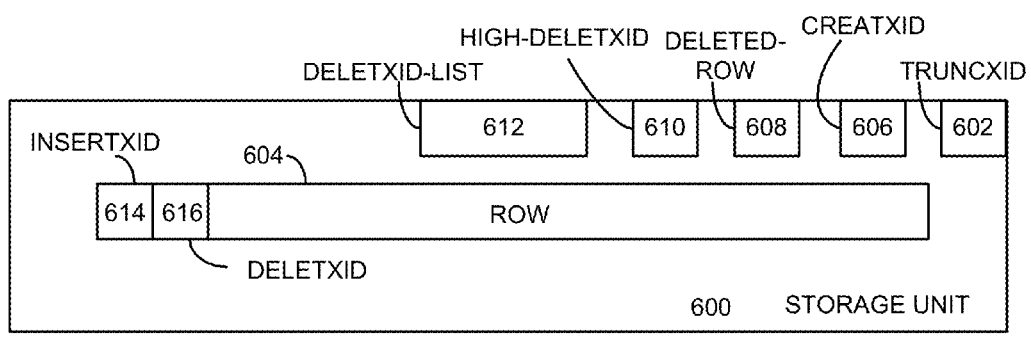
FIG. 6 illustrates an example of a data storage unit in various embodiments.

FIG. 6 illustrates an example data storage unit 600 in various embodiments. Each data storage unit 600 may have an associated "truncate transaction id", or truncxid 602, that is either undefined or is a txid of a transaction that is truncating or has truncated a table when data storage unit 600 was part of the table. Creatxid 606 indicates the txid of the transaction that caused data storage unit 600 to be assigned to a table. Data storage unit 600 may include one or more rows 604 of a table, each of which may have an insertxid 614, which is a txid of a transaction that inserted the row into the table, and a deletxid 616, which is a txid of a transaction that deleted the row or is undefined indicating that the row has not been deleted.

The semantics of truncxid 602, which may be updated in the data storage unit metadata without examining any rows in the storage unit, are that all rows in the storage unit that do not already have a defined deletxid 616 are treated as if they had a deletxid 616 equal to the truncxid 602. When data storage units 600 including a table are scanned by a database query with a transaction snapshot descriptor txsd, a data storage unit 600 can be bypassed completely if IsTxVisible (truncxid, txsd) is true, because, in effect, IsTxVisible(row.deletxid, txsd) would be true for all rows in data storage unit U, which in turn implies that IsRowVisible(row, txsd) is false for all rows in data storage unit U. Thus, truncated extents appear to be absent in a table when the truncating transaction is visible to the querying transaction (this includes a case in which the querying transaction is the truncating transaction itself), but do appear to be present in the table to "concurrent" transactions that started before the truncating transaction committed (for which IsTxVisible (truncxid, txsd) will be false).

Whenever a current transaction completes (commits or rolls back), data storage units 600, for which IsDeleteReclaimable(truncxid) is now true, can be reclaimed. Thus, data storage units 600 are reclaimed as soon as possible after a commit by the truncating transaction, and a user need not invoke a reclamation command.

Snapshot Isolation does not permit concurrent transactions to delete or update a same row. This can be achieved by a transaction verifying, before marking a row with its own deletxid 616, that the row does not already have a defined deletxid 616. A transaction that finds a defined deletxid 616 on a row it wishes to delete or update may be rolled back or queued for resubmission at a later time, depending upon a particular RDBMS implementation.

Similarly, if an UPDATE or DELETE is attempting to mark a row deleted in a storage unit that is concurrently truncated, the row must appear to have deletxid 616 equal to truncxid 602 on the storage unit so that the verification is correctly performed and the deleting or updating transaction rolled back or queued for later submission.

Write conflicts may be prevented between a TRUNCATE and a concurrent UPDATE or DELETE, where the deleted row is still visible to a truncating transaction. It would seem that the TRUNCATE would require examination of the deletxid 616 of all visible rows in the table. However, in effect, this would negate much of the performance benefit of TRUNCATE over a DELETE of all rows. To avoid negating much of the performance benefits over a DELETE of all rows, additional metadata may be added to data storage units 600. For example, with reference to FIG. 6, deleted-row 608, when true, indicates that at least one row of a table has been deleted in a data storage unit 600. Otherwise, deleted-row 608 may have a false value. When deleted-row 608 is false, rows in data storage unit 600 may not be examined when executing a TRUNCATE. High-deletxid 610, for systems that use monotonically increasing txids, may contain a highest deletxid 616 from among all rows 604 in storage unit 600. If high-deletxid 610 is smaller than a txid of a truncating transaction and smaller than any txid on the truncating transaction's invisibility list, then rows in storage unit 600 are not examined when executing a TRUNCATE. Deletxid-list 612 may be a list of distinct deletxids 616 for rows in data storage unit 600. If none of the txids in deletxid-list 612 appear on the truncating transaction's invisibility list, then records in data storage unit 600 are not examined when executing a TRUNCATE.

Various embodiments may not have all of deleted-row 608, high-deletxid 610, and deletxid-list 612 and typically will have only one of deleted-row 608, high-deletxid 610, and deletxid-list 612. Checking of the above conditions may be performed for only those items that are actually present on data storage units 600.

In existing systems, if a SQL DELETE statement has a WHERE clause, but deletes a significant fraction of the rows in a table, generally it performs very poorly. To support a faster variant that is similar to, but not as fast as, the TRUNCATE TABLE command in present invention embodiments, each data storage unit 600 in a table has additional metadata "creatxid" 606, which is the txid of a transaction that assigned data storage unit 600 to a table. A "mass delete" operation, which in some embodiments could be expressed as TRUNCATE TABLE with a WHERE clause, would work as follows:

a) If Snapshot Isolation is in effect for this transaction, check for write conflicts on rows that satisfy a predicate in a WHERE clause for TRUNCATE TABLE.
  b) Identify rows in the table that do not satisfy the predicate in the WHERE clause and copy them, with their insertxids 614 and deletxids 616, to new data storage units 600 marked with "creatxid" 606 equal to the txid of this transaction. A transaction with snapshot descriptor txsd will not see new data storage units 600 unless IsTxVisible(creatxid, txsd) is true.
  c) Mark existing data storage units 600 in the table with "truncxid" 602 equal to the txid of this transaction, as previously described for TRUNCATE TABLE.
  d) Queries from concurrent transactions that started before the deleting transaction commits, will see only the rows in the existing data storage units 600 and not the copied rows in the new data storage units 600.
  e) Queries for transactions that start after the deleting transaction commits will see only the copied rows in the new storage units and not the rows in the existing storage units.
  f) The existing storage units are reclaimed as already described for TRUNCATE TABLE.

For systems in which individual storage "partitions" of a table can be truncated, various embodiments include an ALTER TABLE TRUNCATE PARTITION. Data storage units 600 in partitions that are being truncated remain invisible to older concurrent transactions, and are reclaimed only when it is known that no current or future transaction can possibly see data in the storage units.

Various embodiments may also support multiple versions of table definition metadata (often referred to as a "system catalog"), allowing queries from transactions that started before a DROP TABLE committed to continue to see the table definition. The storage units associated with the table will be marked with "truncating transaction" identifiers in a same way as for TRUNCATE TABLE, and will not be reclaimed until it is known that no current or future transaction can possibly see the definition of the table from before it was dropped.

Figure 7:
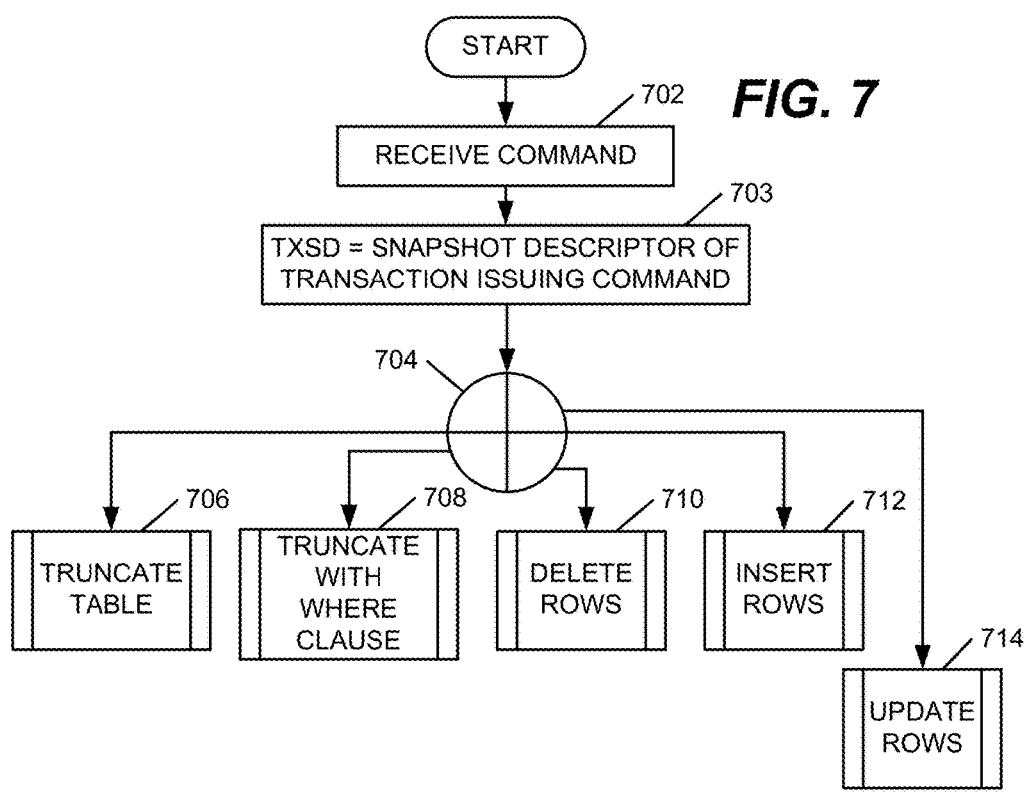
FIGS. 7-16 illustrate example processing of various commands in a number of embodiments.

FIG. 7 is a flowchart illustrating example processing that may be performed in various embodiments. The process may begin with receiving a command (act 702). Then, TXSD may be set to a snapshot descriptor of a transaction issuing the command (act 703) Next, a determination may be made regarding what type of command was received (act 704). If the command is determined to be a truncate table command, then a truncate table routine may be called (act 706).

Figure 8:
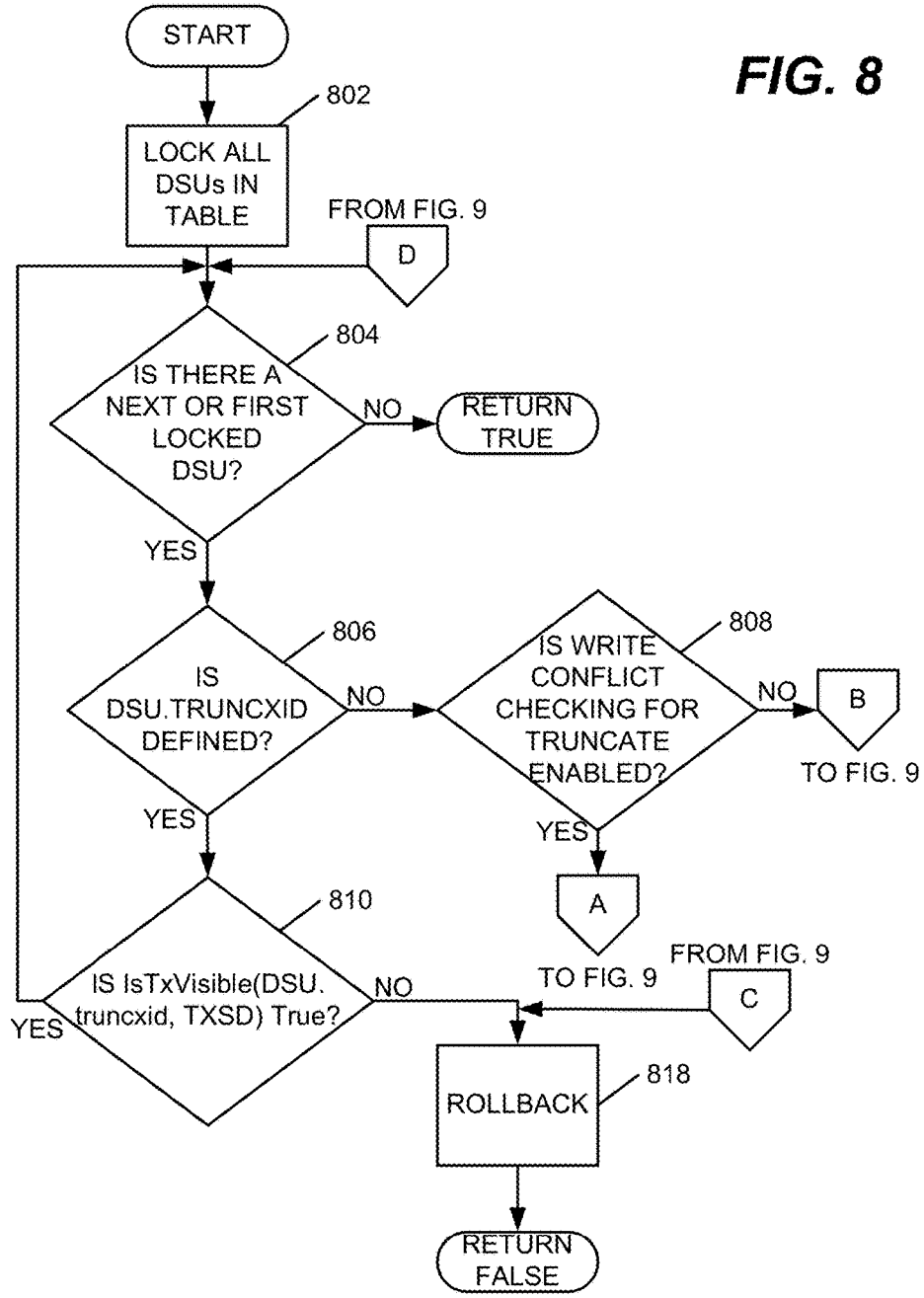
Figure 9:
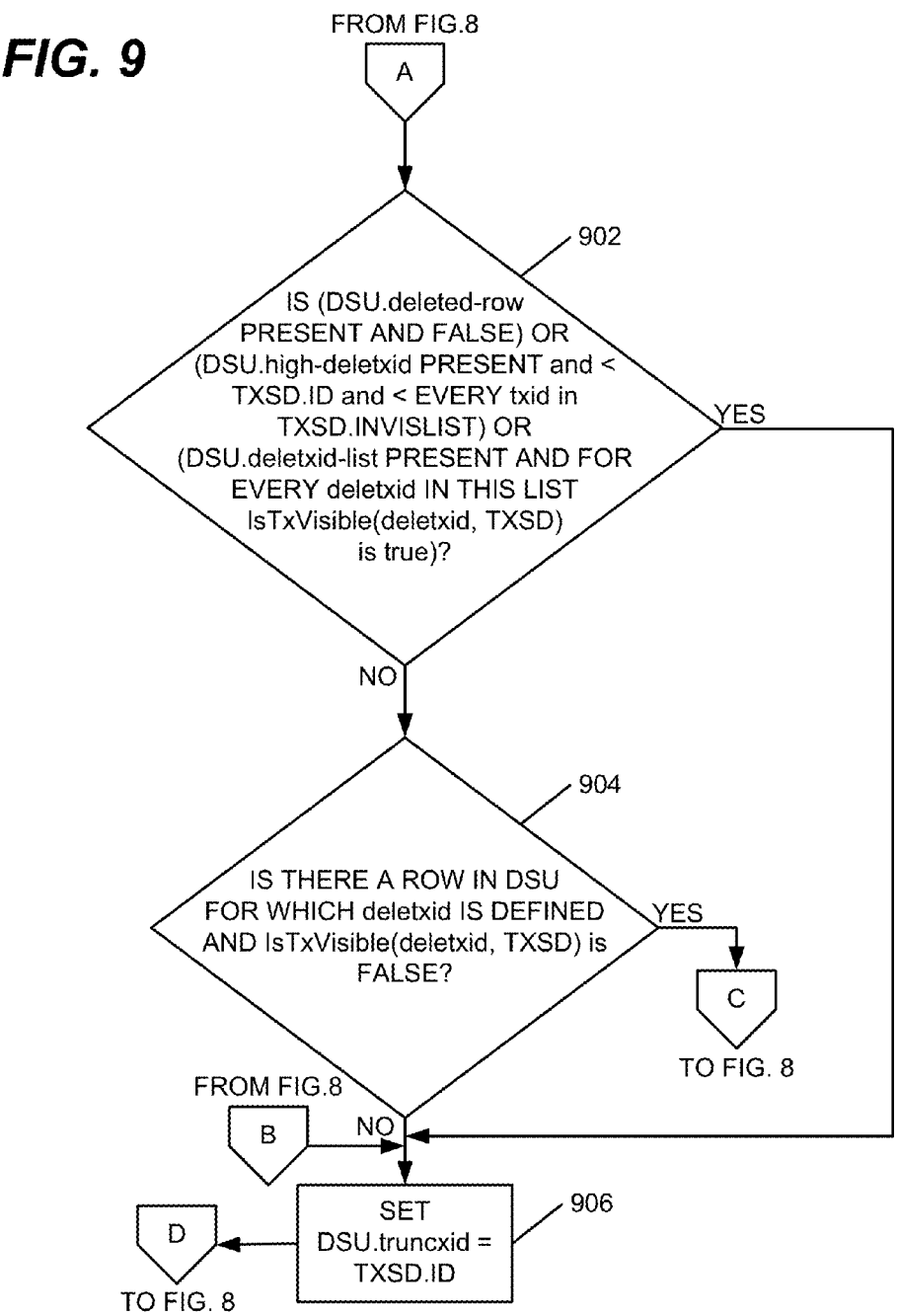

FIGS. 8 and 9 are flowcharts illustrating example processing of a truncate table command in various embodiments. The process may begin by locking all data storage units (DSUs) in a table, waiting if necessary when another transaction already has a DSU locked (act 802). Then, a determination may be made regarding whether there is a first DSU for the table (act 804). If there is no DSU, then control may return to a calling program with a value of true, indicating truncation of the table.

If a DSU is found, then DSU.truncxid may be checked to determine whether DSU.truncxid is defined (act 806). If DSU.truncxid is defined a check may be made to determine whether IsTxVisible(DSU.truncxid, TXSD) is true (act 810). If IsTxVisible(DSU.truncxid, TXSD) is false the table was concurrently truncated. The truncate may be rolled back or queued for resubmission at a later time, depending upon a particular DBMS implementation (act 818).

If, at act 806, DSU.trucxid is determined to be defined, and at act 810, IsTxVisible(DSU.truncxid, TXSD) is determined to be true, then the DSU may be skipped because it was already truncated by this transaction or by an earlier transaction that committed before this transaction started. Control may return to act 804 to find a next locked DSU.

If, during act 806, DSU.truncxid is determined to be undefined, then a check may be made to determine if write conflict checking for truncate is enabled (act 808). If write conflict checking for truncate is determined to be not enabled, then DSU.truncxid may be set to TXSD.ID (act 906; FIG. 9) indicating the transaction ID of the truncating transaction.

If, during act 808, write conflict checking for truncate is determined to be enabled, then a determination may be made regarding whether there may be any rows in the DSU marked deleted by a concurrent transaction, i.e. if DSU.deleted-row is present and is false, or DSU.high-deletxid is present and is smaller than TXSD.ID and also smaller than every txid in TXSD.INVISLIST, or DSU.deletxid-list is present and for every deletxid in this list IsTxVisible(deletxid, TXSD) is true (act 902; FIG. 9). If so, rows in the DSU are not examined and processing continues at act 906. Otherwise, there could be conflicting concurrent deletes in the DSU. The deletxids of the rows in the DSU are examined to see if there actually is a conflicting concurrent delete, i.e., deletxid is defined and IsTxVisible(deletxid, TXSD) is false (act 904). If there is a row in the DSU for which deletxid is defined and IsTxVisible(deletxid, TXSD) is false, then control may return to act 818 (FIG. 8) to rollback the truncate or queue the truncate for resubmission at a later time. Otherwise, DSU.truncxid may be set to TXSD.ID and control may be returned to act 804 (FIG. 8) to determine whether there is a next locked DSU.

Figure 10:
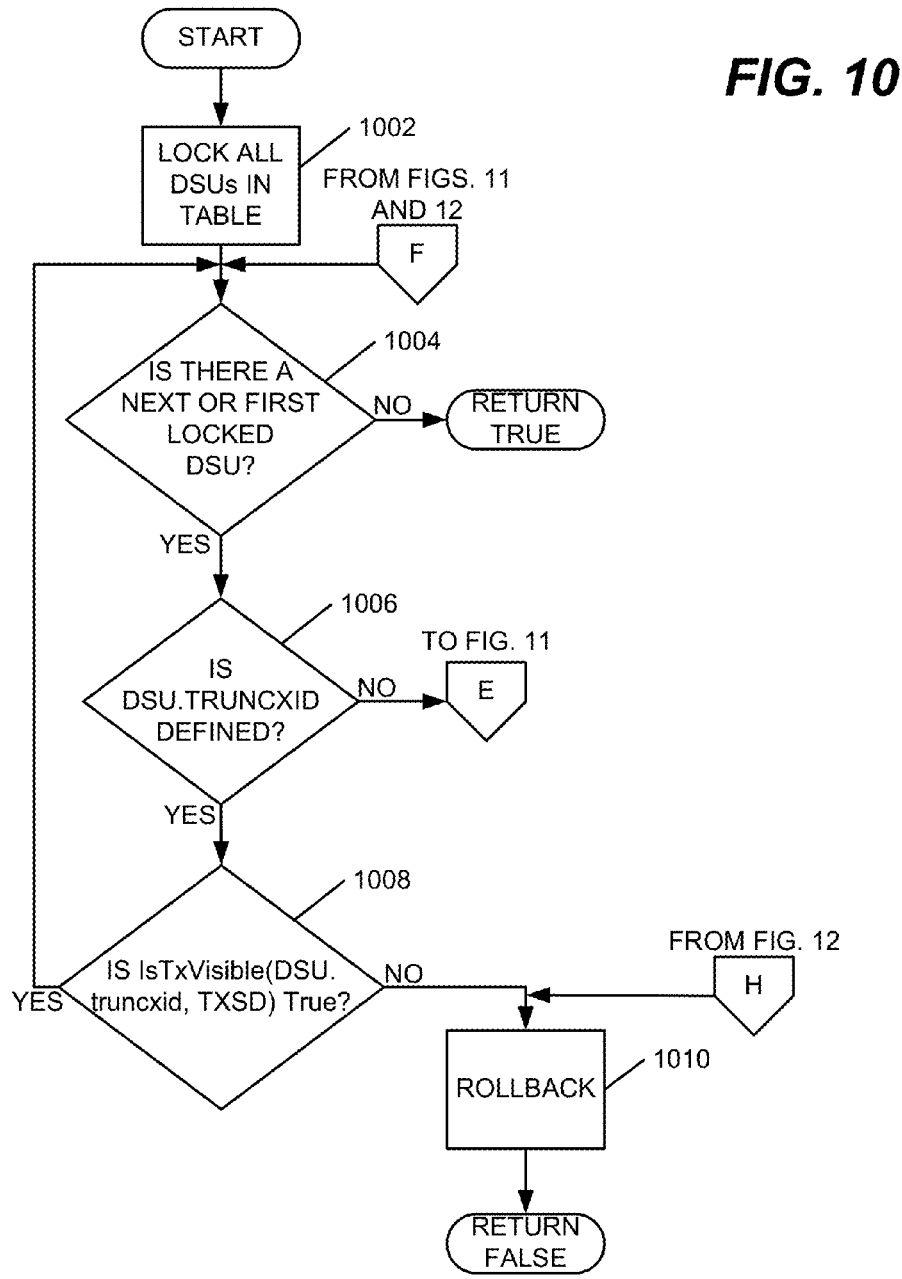
Figure 11:
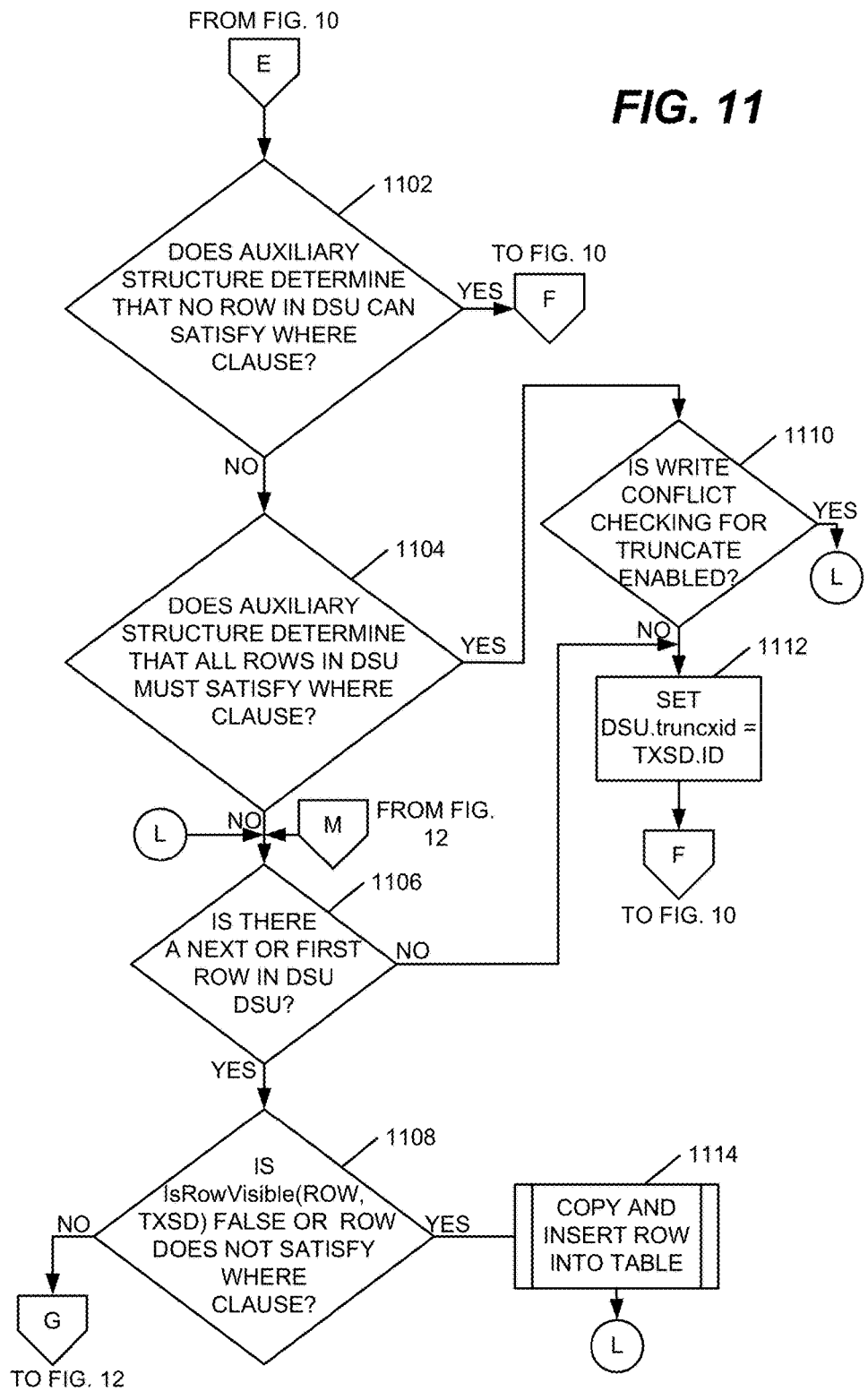
Figure 12:
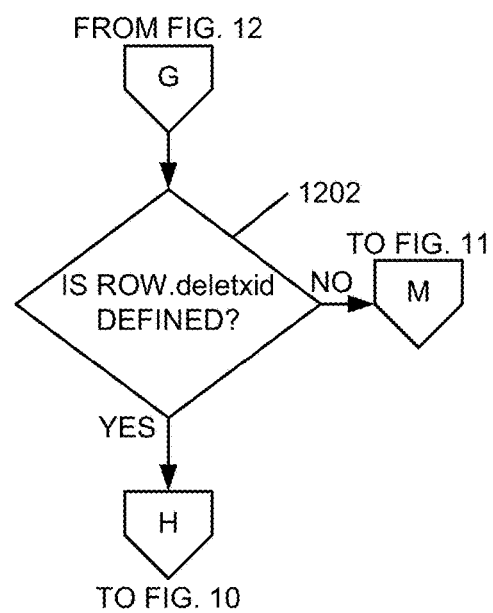

Returning to FIG. 7, if during act 704, the received command is determined to be a truncate with a where clause, a routine may be called for performing processing for the command (act 708). FIGS. 10-12 are flowcharts illustrating example processing in various embodiments to process a truncate command with a where clause.

The process may begin by locking all DSUs in a table and waiting, if necessary, if another transaction already has a DSU locked (act 1002). Once the lock is obtained, a determination is made regarding whether any DSUs exist for the table (act 1004). If there are no DSUs, processing of the command completes and control returns to a calling program. Otherwise, DSU.truncxid is checked to determine whether DSU.truncxid is defined (act 1006).

If DSU.truncxid is defined and IsTxVisible (DSU.truncxid, TXSD) is true (act 1008), the DSU may be skipped because it was already truncated by this transaction or by an earlier transaction that committed before this transaction started. Control passes to act 1004 to obtain a next locked DSU.

If, during act 1006, DSU.truncxid is determined to be undefined and an auxiliary structure (e.g., an index or zone map or synopsis) can be used to determine that none of the rows in the DSU can satisfy the where clause of the truncate (act 1102; FIG. 11), the DSU may be left as is and processing may continue with obtaining a next DSU in the table (act 1004; FIG. 10).

If, during act 1102 (FIG. 11), it is not determined that none of the rows in the DSU can satisfy the where clause of the truncate, then it is determined whether the auxiliary structure can be used to determine that all of the rows in the DSU will satisfy the where clause of the truncate (act 1104). If so, then a check may be made to determine if write conflict checking for truncate is enabled (act 1110). If write conflict checking for truncate is not enabled, none of the rows in the DSU are to be retained and copied. DSU.truncxid may be set to txsd.ID (act 1112) and the next DSU may be obtained (act 1004; FIG. 10).

If, during act 1104, the presence of rows in the DSU not satisfying the where clause cannot be ruled out, or if during act 1110 it is determined that write conflict checking for truncate is enabled, then a determination may be made regarding whether there is a next row in the DSU (act 1106). If no additional rows exist, then DSU.truncxid may be set to txsd.ID (act 1112).

Figure 15:
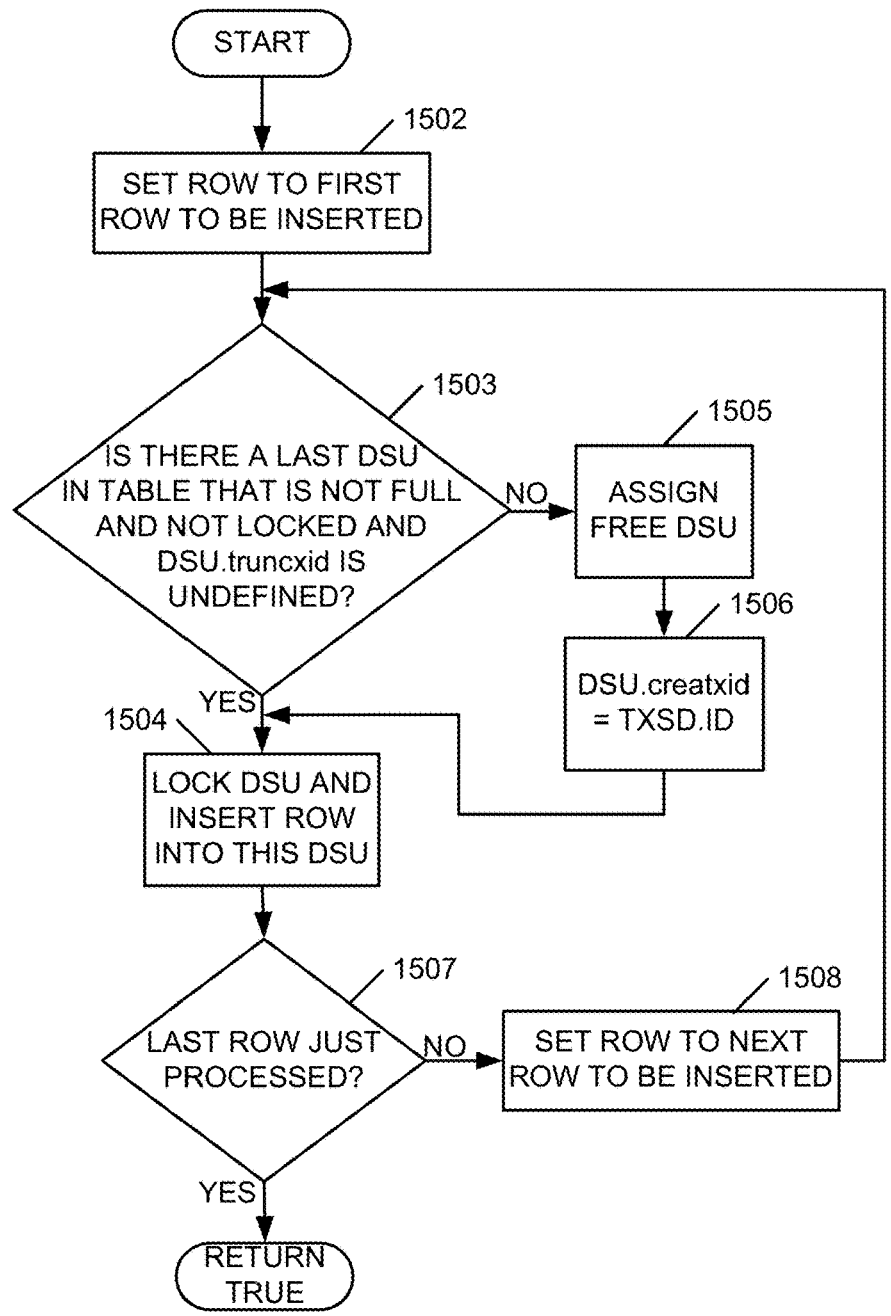

Otherwise, if it is determined that IsRowVisible(row, txsd) is false or the row does not satisfy the where clause (act 1108), copy and reinsert the row into the table (act 1114), as illustrated in FIG. 15. Then the processing may continue with a next row in the DSU (act 1106).

If IsRowVisible(row, txsd) is True and the row satisfies the where clause, then a determination may be made regarding whether the row.deletxid is defined (act 1202; FIG. 12). If row.deletxid is defined (note that IsTxVisible(row.deletxid, TXSD) will be false because the row is visible to TXSD), the row to be deleted was concurrently deleted or updated. The transaction may be rolled back or queued for resubmission at a later time (act 1010; FIG. 10). If, during act 1202, row.deletxid is undefined, processing may continue with a next row in the DSU (act 1106; FIG. 11).

Figure 13:
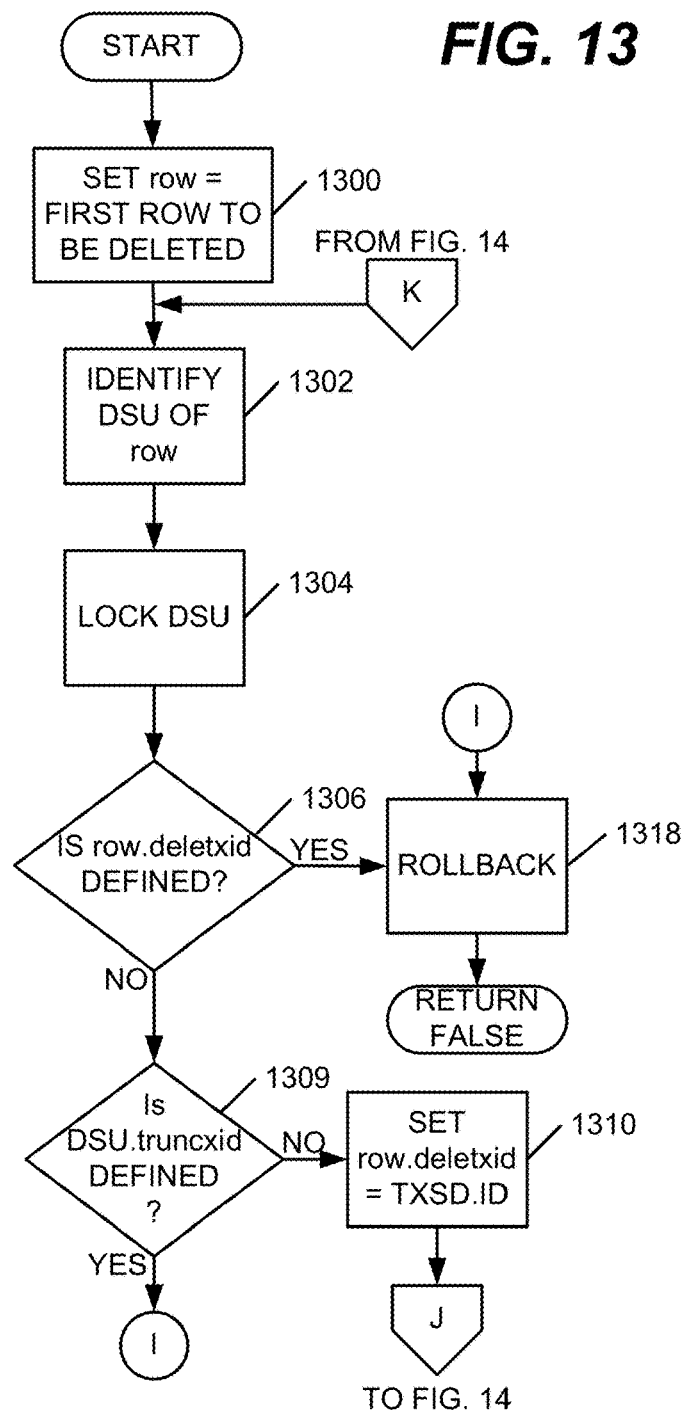

Returning to FIG. 7, if, during act 704, a determination is made regarding the received command being an DELETE command, then a delete rows routine may be called (act 710). FIG. 13 is a flowchart illustrating sample processing of a delete rows command in various embodiments. First, row is set to a first row to be deleted (act 1300). Then, a DSU of the row to be deleted may be identified (act 1302). A lock on the DSU may be requested, waiting if another transaction already has the lock on the DSU (act 1304). Once the lock is obtained, check if row.deletxid is defined (act 1306).

If row.deletxid is defined, the row to be deleted was concurrently deleted or updated. Rollback the transaction or queue the transaction for resubmission at a later time, depending upon a particular DBMS implementation (act 1318). Control may then return to a calling program with a false indication indicating that the command was not executed.

If, row.deletxid is not defined, check if DSU.truncxid is defined (act 1309). If DSU.truncxid is defined, the DSU of the row to be deleted was concurrently truncated. Rollback the transaction or queue it for resubmission at a later time, depending upon a particular DBMS implementation (act 1318). Control may then be returned to a calling program with a false indication indicating that the command was not executed.

Figure 14:
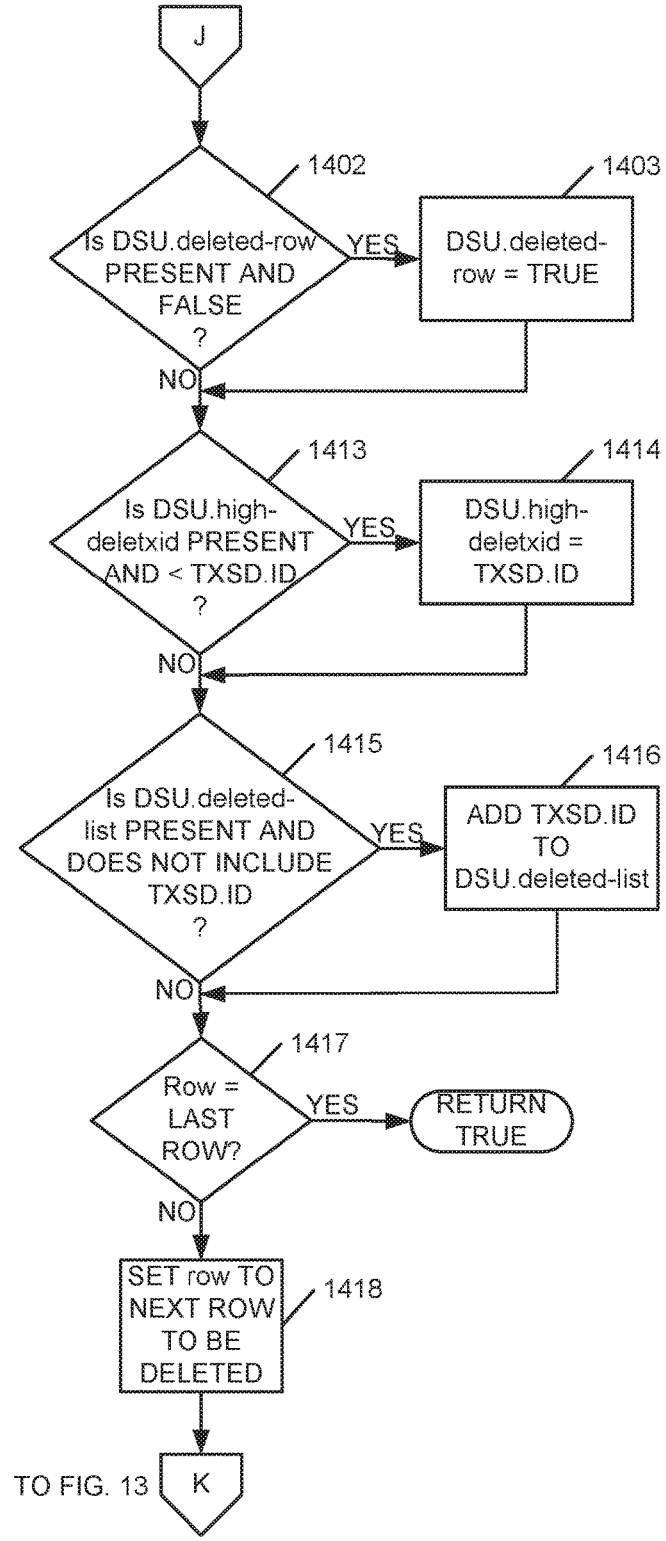

If DSU.truncxid is not defined, then row.deletxid may be set to TXSD.ID (act 1310). Then, if DSU.deleted-row is present and false (act 1402; FIG. 14), DSU.deleted-row may be set to true indicating that a row in the DSU is deleted (act 1403).

If DSU.high-deletxid is present and less than TXDS.ID, (act 1413), then DSU.high-deletxid may be set to TXSD.ID (act 1414). Then, if DSU.deletxid-list is present and does not include TXSD.ID (act 1415), then add TXSD.ID to DSU.deleted-list (act 1416).

If the last row to be deleted was just processed (act 1417) then return control to a calling program with an indication of true indicating that the command was successfully executed. Otherwise, prepare to process a next row to be deleted (act 1418) and control returns to act 1302 (FIG. 13).

Returning to FIG. 7, if, during act 704, a determination is made regarding the received command being an INSERT command, then an insert rows routine may be called (act 712). FIG. 15 is a flowchart illustrating exemplary processing of an insert rows routine. The process may begin by selecting a first row to be inserted (act 1502). Then, find and lock a last DSU in a table that is not full and is not locked and where DSU.truncxid is undefined (act 1503). If there is no such last DSU, a free DSU may be assigned to the table (act 1505). DSU.creatxid may be set to txsd.ID to indicate that a current transaction created the DSU (act 1506).

If either a last DSU was found during act 1503 or DSU.creatxid was set to txsd.ID during act 1506, then the row may be inserted into the locked DSU (act 1504). If the last row to be inserted was just processed (act 1507) then return control to a calling program with an indication of true indicating that the command was successfully executed. Otherwise, prepare to process a next row to be inserted (act 1508), and control returns to act 1503.

Figure 16:
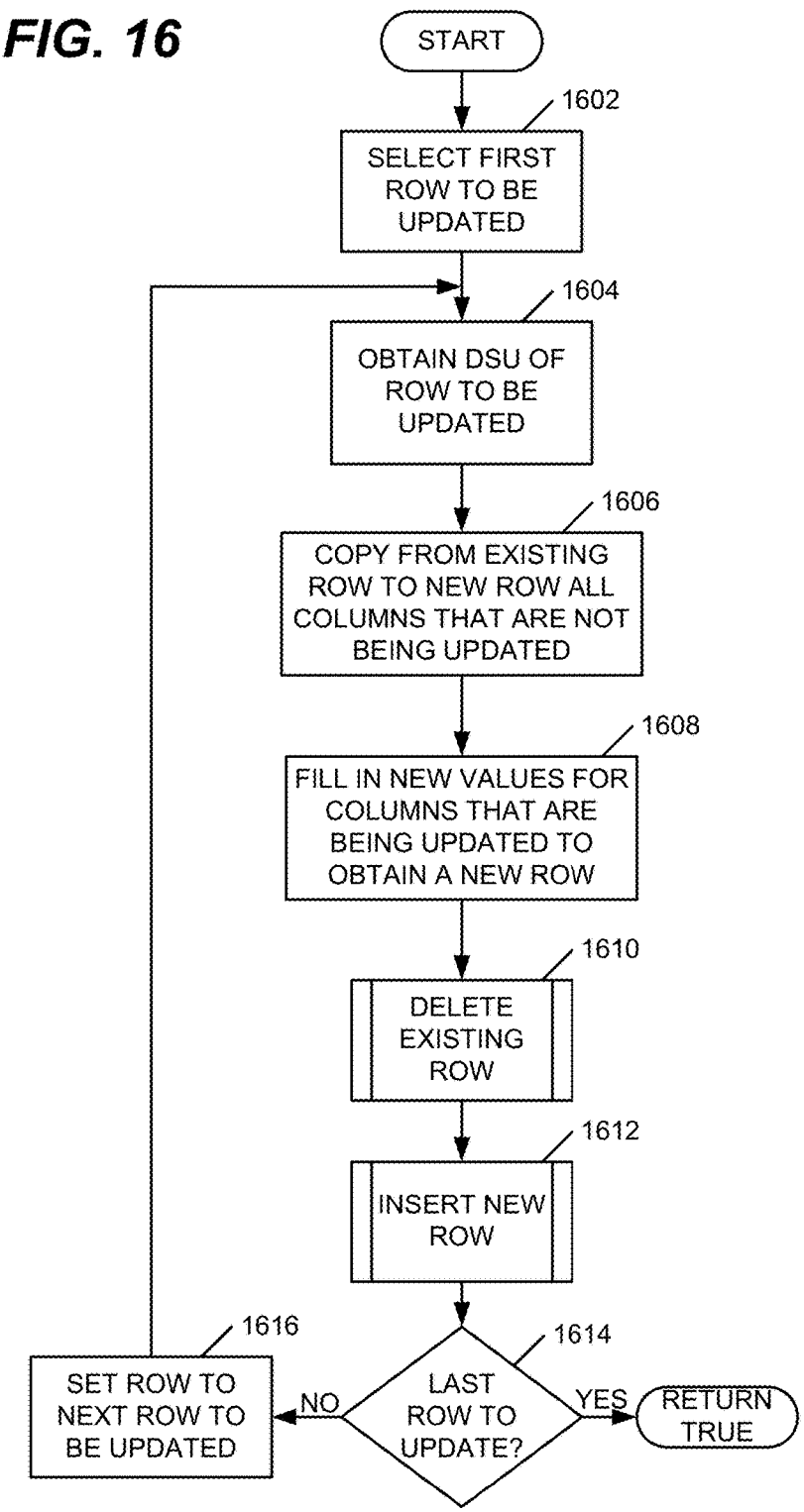

Returning to FIG. 7, if, during act 704, the received command is determined to be an UPDATE command, then an update rows routine may be called (act 714). FIG. 16 is a flowchart of an example update rows routine in various embodiments. The process may begin by selecting a first row to be updated (act 1602). Then, the process may obtain a DSU having an existing row to be updated (act 1604). Next, columns that are not being updated may be copied from the existing row to a new row to be inserted (act 1606). New values for columns that are being updated may be filled in with respect to the new row to be inserted (act 1608). Next a routine may be called to delete the existing row of the table (act 1610). An example flowchart of the delete rows routine was discussed with respect to FIGS. 13-14. Next, an insert rows routine may be called (act 1612). An example flowchart of the insert row routine was discussed with respect to FIG. 15. If a last row to be updated was just processed (act 1614) then return control to a calling program with an indication of true indicating that the command was successfully executed. Otherwise, prepare to process a next row to be updated (act 1616), and control returns to act 1604.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwired, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, character strings, steps, operations, elements, and/or components, but do not preclude the presence or addition of one or more other features, integers, character strings, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim as our invention:

1. A processing device comprising:
   at least one processor;
   a memory; and
   a communication bus connecting the at least one processor with the memory, wherein the memory has stored therein instructions, which when executed by the at least one processor cause the processing device to perform a method comprising:
   receiving, from a first transaction, a truncate table command to truncate all rows or a subset of the rows of a database table;
   in response to the receiving the truncate table command, truncating the all rows or the subset of the rows by marking the all rows or the subset of the rows of the database table as being deleted such that truncated rows appear truncated to transactions that started after the truncating and the truncated rows appear as not truncated to transactions that started before the truncating;
   performing at least one read operation on the truncated database table for at least one transaction concurrent with the first transaction; and
   reclaiming storage units storing the truncated rows when the truncated rows appear truncated to all current transactions.

2. The processing device of claim 1, wherein the truncate table command is for truncating all rows of the database table.

3. The processing device of claim 1, wherein the method further comprises:
   locking the database table to prevent the at least one concurrent transaction from modifying the one or more rows of the database table.

4. The processing device of claim 1, wherein the method further comprises:
   storing an identifier for each data storage unit in a table indicating visibility of rows in respective data storage units to transactions.

5. The processing device of claim 4, wherein the method further comprises:
   copying one or more remaining rows to new data storage units;
   storing identifiers for existing data storage units in a table and for the one or more new data storage units to indicate visibility of the one or more truncated rows and the one or more remaining rows, wherein the one or more truncated rows is visible to concurrent transactions and the one or more remaining rows are visible to subsequent transactions; and
   reclaiming data storage units storing the one or more truncated rows in response to completion of the concurrent transactions.

6. The processing device of claim 1, wherein the method further comprises:
   precluding concurrent updates and deletes that affect rows currently in the database table; and
   permitting concurrent inserts of rows into the database table only when the rows to insert are to be inserted into newly assigned data storage units.

7. The processing device of claim 6, wherein the method further comprises:
   permitting concurrent updates of the rows and concurrent deletes of the rows only when the updates of the rows are in the newly assigned data storage units.

8. A computer program product comprising:
   a computer readable storage medium having computer readable program code embodied therewith for execution on a processing system, the computer readable program code being configured to be executed by the processing system to:
   receive, from a first transaction executing on a processing device, a truncate table command to truncate all rows or a subset of the rows of a database table;
   in response to the receiving the truncate table command, truncate the all rows or the subset of the rows by marking the all rows or the subset of the rows of the database table as being deleted such that truncated rows appear truncated to transactions that started after the truncating and the truncated rows appear as not truncated to transactions that started before the truncating;

perform at least one read operation on the truncated database table for at least one transaction concurrent with the first transaction; and reclaim storage units storing the truncated rows when the truncated rows appear truncated to all current transactions.

9. The computer program product of claim 8, wherein the truncate table command is for truncating all rows of the database table.

10. The computer program product of claim 8, wherein the computer readable program code is further configured to be executed by the processing system to:

lock the database table to prevent the at least one concurrent transaction from modifying the one or more rows of the database table.

11. The computer program product of claim 8, wherein the computer readable program code is further configured to be executed by the processing system to:

store an identifier for each data storage unit in a table indicating visibility of rows in respective data storage units to transactions.

12. The computer program product of claim 11, wherein the computer readable program code is further configured to be executed by the processing system to:

copy one or more remaining rows to new data storage units;

store identifiers for existing data storage units in a table and for one or more new data storage units to indicate visibility of one or more truncated rows and the one or more remaining rows, wherein the one or more truncated rows is visible to concurrent transactions and the one or more remaining rows are visible to subsequent transactions; and reclaim storage units storing the one or more truncated rows in response to completion of the concurrent transactions.

13. The computer program product of claim 8, wherein the computer readable program code is further configured to be executed by the processing system to:

preclude concurrent updates and deletes that affect rows currently in the database table;

permit concurrent inserts of rows into the database table only when the rows to insert are to be inserted into newly assigned data storage units; and permit concurrent updates of rows and concurrent deletes of the rows only when the rows are in the newly assigned data storage units.

* * * * *